Dec. 4, 1962 G. SPRINGER ETAL 3,066,918
CAKE PAN STAND
Filed June 6, 1960

INVENTORS
GEORGE SPRINGER
HENRIETTA A. SPRINGER
BY Cohn and Powell
ATTORNEY.

United States Patent Office 3,066,918
Patented Dec. 4, 1962

3,066,918
CAKE PAN STAND
George Springer and Henrietta A. Springer, both of 3 Blackberry Drive, St. Charles, Mo.
Filed June 6, 1960, Ser. No. 34,210
6 Claims. (Cl. 257—250)

This invention relates generally to improvements in a cake pan stand, and more particularly to an improved stand adapted to support a cake pan of the tube type.

It has been the general practice in baking cakes, bread and the like to deposit the baked product on a surface, such as a grill or the like for cooling under atmospheric or other conditions, shortly after withdrawing the baked product from the oven. Because of the plastic or fragile nature of the product before being cooled, the weight of the upper portion of the cake or bread exerted on the lower portion greatly impairs the texture of the product. This undesirable result is caused by a compression or a collapse of the cell structure, whereby the product becomes doughy or crumbles.

Also in general use for baking specific kinds of bakery products are cake pans of the tube type. These pans are well known and include a central tubular portion which leaves an opening at the center of the cake baked in such a pan. Tube pans are used primarily for sponge cakes, angle food cakes and particularly the newer chiffon cakes.

In some cases, the central tube of these pans extends above the outer rim of the pan to facilitates the support of the pan in inverted position while the cake is cooling. Because the top of this tubular portion is relatively narrow, its use as a support leaves the inverted cake in a relatively unstable position. Furthermore, the tubes ordinarily fail to extend far enough above the remainder of the pan to provide adequate space beneath the inverted cake for circulation of air during cooling. Accordingly, it is a general practice to use an inverted funnel or a beverage bottle as an auxiliary support for the inverted tube pan. However, these make-shift supports are still relatively unstable and do not provide for efficient cooling of the cake pan or the cake contained therein.

One attempt to avoid the difficulties discussed above involves the use of a plurality of legs extending upwardly from the rim of the pan, these legs serving to support the pan in inverted position. However, these projecting legs are easily damaged and interfere with stacking of the cake pans incident to storage.

An important object is to provide a cake pan support for tube type pans that functions not only to preserve, but to enhance the texture of sponge, angel food and like cakes, and to increase the lightness and fluffiness of such cakes.

Another important object is achieved by the stand in that the process of cooling sponge, angel food and like cakes and bakery products is materially improved so that the cellular structure of the product is maintained and enhanced, and consequently baking failures caused by "falling" during cooling is eliminated.

Still another important object is realized by the provision of a stand that serves to support the hollow center tube of the cake pan when inverted, thereby enabling the bakery product to cool while being suspended from the interior surfaces of the container in which the product was baked.

In carrying out the invention, the sponge, angel food and like cake is removed from the oven after completion of the baking operation, and the product is inverted and maintained in this position on the stand during the cooling operation. During such cooling, the product freely hangs from the inner surfaces of the container, the container being maintained in a substantially vertical position. The forces of gravity are, of course, exerted downwardly within the product and these forces tend to expand the minute cells, thus providing an increased fluffiness and a lighter final product. The product which adheres to the interior of the baking pan during cooling, will not "fall" and the walls of the cell structure will not collapse. The term "fall" or "falling" is used in the bakery trade to denote the collapse or crushing of the cellular structure.

While the process of this invention is particularly adapted for cooling sponge and angel food cakes, which normally adhere to the walls of the container in which they are baked, it is within the contemplation of the invention to employ the herein disclosed stand for cooling any bakery products that will normally adhere to a tube type baking pan or any product which can be caused to adhere to a tube type baking pan.

Yet another important object is achieved by providing a stand base having a substantially conical post, and a plurality of flanges extending outwardly from the post adapted to support the hollow center element of the inverted cake pan, the conical post and flanges providing air passages that communicate with the open end, and hence with the interior, of the center element for improved cooling of the bakery product.

Another important objective is realized by the provision of the radially extending flanges on the conical post which facilitate the dissipation of the heat to the atmosphere and thereby prevent excessive heating of the stand while supporting the inverted pan.

Other important advantages are afforded by the conical post and radial flanges in providing an exceedingly stable structure that will not tip while supporting an inverted tube type baking pan. The upper margins of the flanges are curved downwardly from the conical post and thence upwardly at their outermost ends to provide an automatic centering of the center tube on the stand and to preclude lateral shifting of such center tube.

An important object is to provide a cake pan stand that is simple and durable in construction, economical to manufacture, efficient in operation, and which can be readily utilized by anyone without any instructions.

The foregoing and numerous other objects and advantages of the invention will more clearly appear from the following detailed description of a preferred embodiment, particularly when considered in connection with the accompanying drawing, in which.

Figure 4:
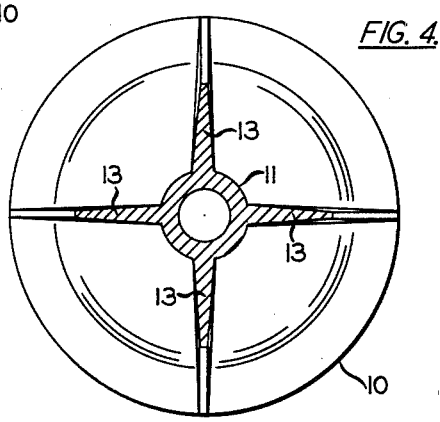
FIG. 4 is a cross sectional view of the stand as seen along line 4—4 of FIG. 3.
Figure 3:
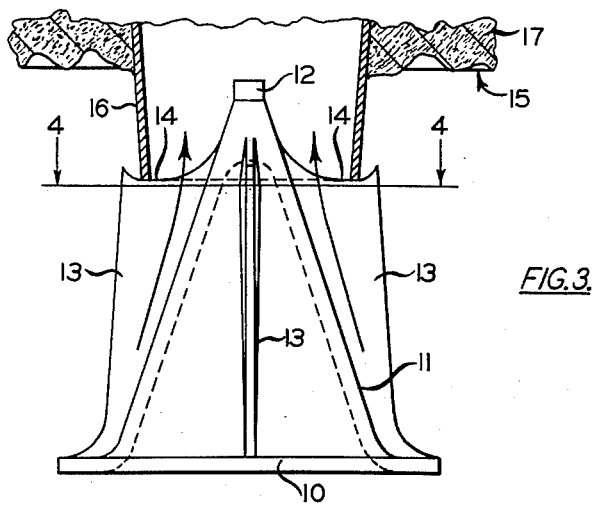
FIG. 3 is a front elevational view of the stand shown in FIG. 2, the center tube of the cake pan supported thereon being illustrated in cross-section.

Referring now by characters of reference to the drawing, it is seen that the cake pan stand includes a base 10 adapted to seat on a supporting subjacent surface such as a table or counter top. Extending upwardly from the center of the base 10 is a vertical, substantially conical center post 11. In order to make the pan stand light in weight and to effect an economy in material, the conical post 11 is substantially hollow as is best seen in FIGS. 3 and 4. Formed on the uppermost tip of conical post 11 is a short cylindrical portion 12 of substantially constant diameter.

Extending radially outward from the conical post 11 are a plurality of flanges 13. In the embodiment disclosed, there are a total of four flanges 13 equidistantly spaced angularly about the post 11, i.e., the flanges 13 being disposed in 90 degree relationship. Of course, any suitable number of flanges 13 can be conveniently and advantageously utilized in the stand. For purposes which will appear upon later description of parts and operation, the flanges 13 extend substantially height of the conical post 11.

Each of the flanges 13 is provided with an uppermost margin 14 that curves downwardly from the top of post 11 and thence curves upwardly at its outermost end.

In the preferred embodiment, the cake pan stand is cast or moulded as an integral, unitary piece. In other words, the base 10, conical post 11 and flanges 13 are formed integrally.

The tube type cake pan generally indicated at 15 in FIG. 3 includes a center element or tube 16 that normally extends below the rim of the pan 15 when the pan is inverted as shown. The outermost end of center element 16 seats on and is supported by the upper margins 14 of flanges 13. For completeness of disclosure, a portion of the cake or other bakery product contained in the pan is indicated by reference numeral 17.

Figure 1:
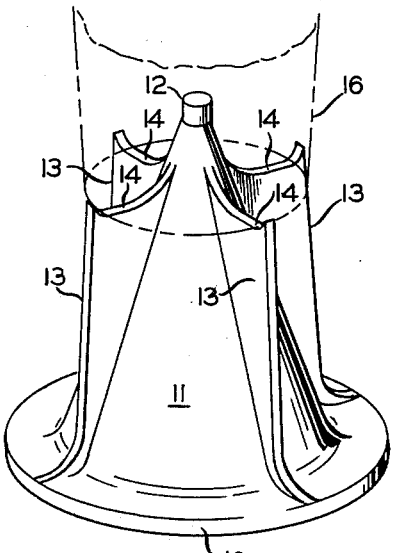
FIG. 1 is a perspective view of the cake pan stand the center tube of the cake pan supported thereon being illustrated in broken lines.
Figure 2:
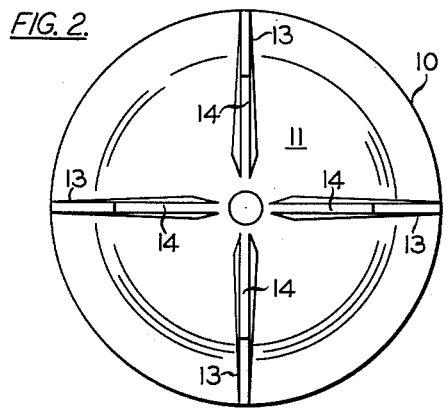
FIG. 2 is a top plan view of the stand.

It is apparent from FIGS. 1 and 3, that the outer peripheral diameter of the conical post 11 in a horizontal plane passed through the upper margins 14 of the flanges 13 at the points engaged by the hollow center element 16 of the inverted cake pan 15 is less than the innermost diameter of the center element so as to provide spaces therebetween through which air flows into the interior of the center element 16. The conical post and flanges 13 define air passages that extend upwardly and communicate with the interior of center element 16 through the spaces between the post 11 and center element 16. The flow of air, as is indicated by arrows in FIG. 3, is upwardly along the outer surface of conical post 11, the air flow being guided in the upwardly direction and thence guided into the open end of center element 16 by the flanges 13 to effect an efficient cooling of the inner portion of the cake 17 adjacent the center element 16.

The flanges 13 provide other advantages in that they present more surface area to the atmosphere and thereby effect a more efficient dissipation of the heat transmitted to the stand by the center element 16 to the atmosphere. Thus it is seen that the cake pan stand does not become excessively heated, but on the contrary any heat transmitted to the stand will be quickly dissipated to the surrounding atmosphere by flanges 13.

It is thought that the mode of operation and functional advantages of the cake pan stand have become fully apparent from the foregoing detailed description of parts, but for completeness of disclosure the use of the stand will be briefly described.

After baking, the cake pan together with the cake contained in such pan, is inverted, and the lower end of the center element 16 is seated on the upper margins 14 of the stand flanges 13. The curvilinear margins 14 automatically center the tubular element 16 on the stand and preclude lateral shifting, thereby increasing the stand's stability.

Cooling air flows upwardly along the conical post 11 between the flanges 13, the flanges 13 guiding the air flow through the spaces between the center element 16 and the conical post 11 and thence into the interior of center element 16. This flow of air cools the center of the tube type pan and hence cools the inside of the cake 17. Because of this more effective cooling feature, lighter, fluffier and better textured cakes are realized.

Because the flanges 13 extend substantially the entire height of the conical post 11, and because the flanges 13 contact the air flow for a substantial distance in its travel upwardly through the open end of center element 16, the flanges 13 serve to dissipate heat from the base 10 to the surrounding atmosphere. This results in keeping the stand cool and consequently results in more effective cooling of the interior of the tube type pan 15.

Although the invention has been described by making detailed reference to a single preferred embodiment, such detail is to be understood in an instructive, rather than in any restrictive sense, many variants being possible within the scope of the claims hereunto appended.

We claim as our invention:

1. A cake pan and stand comprising an inverted cake pan having a hollow center element, a base having a vertical, substantially conical center post, and a plurality of flanges extending outwardly from said post, said flanges including upper margins supporting the hollow center element of said inverted cake pan, said flanges maintaining said center element in spaced relation to the conical post to provide air passages therebetween, the said flanges having the spaces therebetween open laterally below the said upper margins to provide inlets to said air passages.

2. A cake pan and stand comprising an inverted cake pan having a hollow center element, a base having a vertical, substantially conical center post, and a plurality of flanges extending outwardly from said post, said flanges including upper margins supporting the hollow center element of said inverted cake pan, the peripheral dimension of the conical post in a horizontal plane passed through the upper margins of the flanges at the point engaged by the hollow center element of the inverted cake pan being less than the dimension of the center element so as to provide air passages communicating with the interior of the center element, the said flanges having the spaces therebetween open laterally at all times below the said upper margins to provide inlets to said air passages.

3. A cake pan and stand comprising an inverted cake pan having a hollow center element, a base having a substantially conical center post, and a plurality of flanges extending radially outward from said post, said flanges including upper margins supporting the hollow center element of said inverted cake pan, said upper margins being curved downwardly from the conical post and thence upwardly at their outermost ends so as to preclude lateral shifting of the center element.

4. A cake pan and stand comprising an inverted cake pan having a hollow center element, a base having a vertical, substantially conical center post, and a plurality of flanges extending radially outward from said conical post, said flanges being angularly spaced about the periphrey of said conical post to provide a plurality of air-flow passages therebetween, said flanges including upper margins supporting the hollow center element of said inverted cake pan in spaced relation to said conical post, the spaces between said flanges being open laterally at all times below the upper margins of said flanges, the flow of cooling air being upwardly along the conical post between the flanges and thence into the interior of said center element, said flanges guiding the air-flow in said passages.

5. A cake pan and stand comprising an inverted cake pan having a hollow center element, a base having a vertical, substantially conical center post, and a plurality of flanges extending radially outward from said conical post, said flanges being angularly spaced about the periphrey of said conical post to provide a plurality of air-flow passages therebetween, said flanges extending substantially the height of said conical post, said flanges including upper margins curved downwardly and outwardly from said conical post and thence curved upwardly at their outermost edges, said upper margins supporting the hollow center element of said inverted cake pan, the peripheral dimension of the conical post in a horizontal plane passed through the upper margins of the flanges at the points engaged by the hollow center element being less than the dimension of the center element so as to provide spaces therebetween, said flanges guiding the flow of air upwardly along the periphery of the conical post to said spaces and thence into the interior of said center element of the inverted cake pan, and said flanges serving to dissipate the heat more efficiently from the stand to the atmosphere, the base including a peripheral lip extending laterally outward from the bottom of said conical post beyond the outermost edges of said flanges.

6. A cake pan and stand comprising an inverted cake pan having a hollow center element, a base having a substantially vertical center post, and a plurality of flanges extending outwardly from said post, said flanges including upper margins supporting the hollow center element of said inverted cake pan, said center element being in spaced relation to the center post to provide air passages therebetween, the said flanges having the spaces therebetween open laterally to provide inlets to said air passages.

References Cited in the file of this patent
UNITED STATES PATENTS

| | | |
|---|---|---|
| 2,613,642 | Hiller | Oct. 14, 1952 |
| 2,976,998 | Smith | Mar. 28, 1961 |
| 2,988,333 | Mesic | June 13, 1961 |